United States Patent [19]

Vitzthum et al.

[11] 4,198,432

[45] * Apr. 15, 1980

[54] PROCESS FOR THE PRODUCTION OF SPICE EXTRACTS

[75] Inventors: Otto Vitzthum, Bremen; Peter Hubert, Bremen-Lesum, both of Fed. Rep. of Germany

[73] Assignee: Studiengesellschaft Kohle mbH, Mulheim, Fed. Rep. of Germany

[*] Notice: The portion of the term of this patent subsequent to Oct. 31, 1995, has been disclaimed.

[21] Appl. No.: 929,139

[22] Filed: Jul. 28, 1978

Related U.S. Application Data

[60] Division of Ser. No. 754,803, Dec. 27, 1976, Pat. No. 4,123,559, which is a continuation of Ser. No. 560,432, Mar. 20, 1975, abandoned, which is a continuation of Ser. No. 258,586, Jun. 1, 1972, abandoned.

[30] Foreign Application Priority Data

Jun. 3, 1971 [DE] Fed. Rep. of Germany ....... 2127611

[51] Int. Cl.² .......................... A23L 1/22; A23L 1/221
[52] U.S. Cl. .................................... 426/312; 426/318; 426/319; 426/638; 426/650
[58] Field of Search ............... 426/312, 655, 318, 319, 426/386, 425, 431, 471, 489, 387, 424, 427, 428, 638, 533, 650, 651

[56] References Cited

U.S. PATENT DOCUMENTS

| | | | |
|---|---|---|---|
| 2,571,948 | 10/1951 | Sair et al. | 426/650 |
| 3,477,856 | 11/1969 | Schultz | 426/424 |
| 3,997,685 | 12/1976 | Strobel | 426/650 X |
| 4,123,559 | 10/1978 | Vitzthum et al. | 426/312 |

FOREIGN PATENT DOCUMENTS

1057911 2/1967 United Kingdom .
1106468 3/1968 United Kingdom .

*Primary Examiner*—Kenneth M. Schor
*Attorney, Agent, or Firm*—Sprung, Felfe, Horn, Lynch & Kramer

[57] ABSTRACT

Process for the preparation of spice extracts by extraction of the natural spice with a supercritical gas such as carbon dioxide in which the aroma contents are first extracted with a dry gas, the flavor contents are then extracted with a moist gas and the extracted materials recovered and mixed.

13 Claims, 1 Drawing Figure

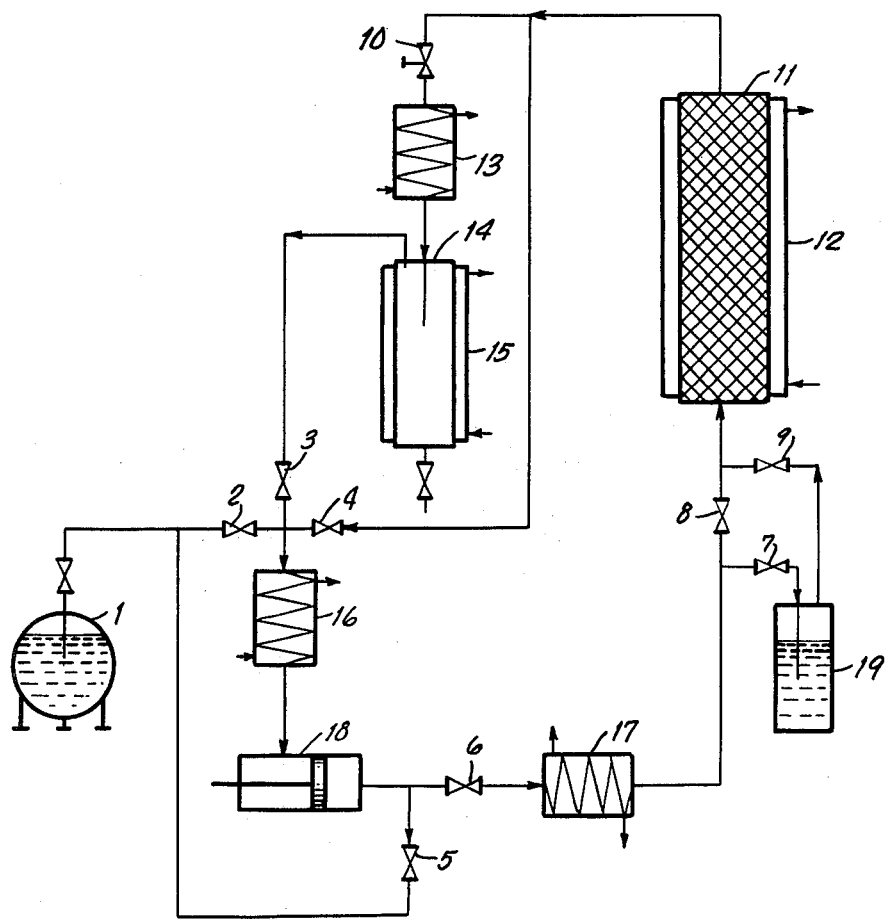

PROCESS FOR THE PRODUCTION OF SPICE EXTRACTS

This application is a division of Ser. No. 754,803, filed Dec. 27, 1976, now U.S. Pat. No. 4,123,559, which is a continuation of Ser. No. 560,432, filed Mar. 20, 1975, now abandoned, which is a continuation of application Ser. No. 258,586, filed June 1, 1972, now abandoned.

BACKGROUND OF INVENTION

The modern tendency in the food industry has been to use extracts wherever possible instead of the natural products. This has been especially true with natural spices such as vanilla, cinnamon, cloves, black pepper and the like.

The use of extracts has a number of decided advantages. For example it is easier to provide and maintain the extracts in a germ free condition than is the case with the natural products. Additionally the vegetable "ballast" is avoided if spice extracts or concentrates are used since the actual spicy components of the natural spices are present in only very minor amounts.

A number of methods have been devised to extract the flavor and aroma constituents from the natural products. The extraction solvents usually employed are organic solvents since the desired constituents are not usually water soluble. This has caused considerable difficulty since it is quite difficult to remove the last traces of the solvent from the residue.

Moreover, there is the possibility of chemical reaction between the solvent and spice with the danger of the production of toxic substances.

THE INVENTION

A process has now been discovered for the production of spice extracts which substantially alleviates the problems of the prior art and comprises the steps of:

1. Extracting the natural spice with a dry extraction solvent gas which is maintained in the supercritical state with respect to temperature and pressure to extract the essential oil content of the spice and leave a first spice residue.

2. Separating the aroma constituents from the extraction solvent by adjusting the temperature or pressure.

3. Extracting the first spice residue with a wet extraction solvent gas which is maintained in the supercritical state with respect to temperature and pressure to extract flavor constituents and leave a second spice residue.

4. Separating the flavor constituents from the extraction solvent by adjusting the temperature or pressure in the presence of the products of Step 2.

The preferred solvents are selected from the group consisting of carbon dioxide; saturated and unsaturated hydrocarbons containing up to about three carbon atoms; nitrous oxide; saturated and unsaturated halogenated hydrocarbons containing up to about three carbon atoms; sulfur hexafluoride and mixtures thereof. Of these, carbon dioxide is by far the most highly preferred, since the use of the other gases may require very careful purification procedures.

This invention is based on the observation that gases which are supercritical with regard to pressure and temperature and harmless with regard to taste, health and chemical composition, are suitable solvents for the odor and flavor components of the spices. With the suggested method it is possible to withdraw more or less completely the odor and flavor constituents of the spices in their natural composition from a large number of components and without any chemical change.

The method according to the invention for the production of spice extracts of natural composition by essentially a two-stage extraction with a solent is characterized by the fact that the essential oils acting as odor components are withdrawn from the spices by extraction with dry gas, and the portions acting as flavor carriers with wet gas which is supercritical with respect to pressure and temperature, and that the extracts are separated from the solutions obtained by varying the pressure and/or temperature and mixing them with each other.

Supercritical with respect to the temperature of carbon dioxide means a temperature above 31.6° C. In practice temperatures as high as 80° C. may be used provided that excessive thermal stress on the substrate is avoided.

Supercritical with respect to the pressure of carbon dioxide means a pressure above 74.3 atm. absolute. In practice pressures as high as 400 absolute atmospheres may be employed.

The corresponding critical data for other gases utilized in this invention can be readily determined from the literature.

It should be noted that, particularly with regard to the odor constituents, an extraction with subcritical liquid carbon dioxide is also possible. This also applies to the other gases mentioned above. But the dissolving power changes abruptly when passing over into the supercritical state, and it is here considerably greater.

It is already known that gases, like $CO_2$, have a good dissolving power under supercritical conditions, which increases when the pressure is increased, but only up to the dissolving power of the liquid phase. In contrast, the applicant has found that this rule does not apply to the extraction of spices, and that the dissolving power of supercritical gaseous phases is much greater than that of the corresponding liquid phases, and it was even much less to be expected that the odor components of the spices can be extracted selectively with dry supercritical gaseous phase, and the flavor carriers of the spices with wet supercritical gaseous phase.

The principal features of the invention are:

A: Withdrawal of the essential oils, which frequently represent the odor aroma, by treating the spices with dry, supercritical carbon dioxide.

B: Withdrawal of the flavor components with wet, supercritical carbon dioxide.

C: Unless already done in the phase B, withdrawal of the purely water-soluble flavor components by extraction with water.

It is frequently advisable to conduct the water extraction step separately so as to minimize the contact of water sensitive substances such as terpenes, aldehydes, esters and the like with water by first extracting them with the selected solvent gas.

The presently preferred procedure for carrying out the process of the invention will be best understood by reference to the drawing, which is a flow diagram for an embodiment of the invention.

The dry gas is stored in tank 1, the natural spice in pressure pipe or tank 11 fitted with temperature control jacket 12. Dry gas in a supercritical state is conducted through tank 11 fitted with temperature control jacket 12 and extracts the aroma constituents from the spice. The dry gas laden with the aroma extracts is passed through throttle valve 10 and heat exchanger 13 into tank 14 also fitted with a temperature control jacket 15. A phase separation between the solvent and solute is effected in tank 14 preferably by reducing the pressure to below the critical pressure. The temperature in the gas can also be reduced to a temperature below the critical temperature, it can be at the same level as in tank 11 or it may even be increased. In principal a separation of the system can also be effected by a temperature increase. Both temperature and pressure effects can be combined, but it is necessary to consider the thermal load capacity of the material. A number of possible variants are listed below.

The extract gas, now freed from the aroma constituents, is pumped out of tank 14 and is returned to tank 11 in a supercritical state, through heat exchangers 16 and 17 and intermediate component 18 which may be either a pump or a compressor.

As it returns to tank 11 the gas is passed through tank 19 and picks up water contained therein. The first residue from the initial extraction is now extracted with wet carbon dioxide which dissolves the flavor constituents of the first residue to leave a second spice residue. These are separated in tank 14 in the same manner as with the first extract. In this second separation a temperature below the critical temperature will result in liquefaction of the supercritical gas, and water will separate. If the temperature is above the critical temperature the gas will not liquefy and the extracted components will be substantially water free. It is thus possible to obtain an extract with no water, or with a low or high water content.

Valves 2,3,4,5,6,7,8, and 9 are provided to facilitate the operation.

In the procedure described the second extract was separated in the presence of the first extract to thereby produce a mix. It is, of course, also possible to effect precipitation in separate tanks, collect them and then mix.

It is clear also that certain of the water soluble constituents of the first residue may be picked up by the web gas so that a separate water extraction step is not necessary.

In many cases at least a part of the flavor constituents are extracted in the first phase so that the second phase may be of considerably shorter duration. This happens in the case of piperine, a flavor component in peppers.

Frequently, as in the case of peppers, a third water extraction step is not necessary. When an aqueous extract is desired it is carried out in the usual manner and the solution concentrated, spray- or freeze-dried. The resulting product may then be mixed with the previous extracts.

While normally the same supercritical gas solvent will be used for both extractions, it is not necessary to do so. The preferred halogenated solvents are those in which at least fifty percent of the hydrogens in the parent hydrocarbon have been replaced with halogens, typically chlorine and fluorine.

The following variants are possible in the first two extraction steps. The symbols $P_1$, $P_2$, $t_1$ and $t_2$ refer to the pressures and temperatures in tanks 11 and 14 respectively.

| 1st Case: Conditions | Preferred absolute values: |
|---|---|
| $P_2 < P_{crit.} < P_1$ | $P_1$ = 100–400 excess at. |
| $t_2 < t_{crit.} < t_1$ | $P_2$ = at least 5 excess at. under $P_{crit.}$ |
| | $t_1$ = at least 5° C. above $t_{crit.}$ up to 80° C. |
| | $t_2$ = at least 5° C. below $t_{crit.}$ |

Here the liquefaction of carbon dioxide, and thus the separation of water take place in 14. The missing water must therefore be added, if necessary, ahead of tank 14.

| 2nd Case: Conditions | Preferred absolute values: |
|---|---|
| $P_2 = P_1 > P_{crit.}$ | $P_1$, $P_2$, $t_1$ = see case 1. |
| $t_2 > t_1 > t_{crit.}$ | $t_2$ = 40°–80° C. higher than $t_1$ |

This case is only possible if the thermal load capacity of the extract is sufficient.

| 3rd Case: Conditions | Preferred absolute values: |
|---|---|
| $P_2 < P_{crit.} < P_1$ | $P_1$, $P_2$, $t_1$, $t_2$ = see case 1. |
| $t_2 = t_1 > t_{crit.}$ | |

| 4th Case: Conditions: | Preferred absolute valves: |
|---|---|
| $P_2 < P_{crit.} < P_1$ | $P_1$, $P_2$, $t_1$, $t_2$ = see case 1. |
| $t_2 t_1 > t_{crit.}$ | |

What has been said under case 2 applies here likewise, because of $t_2$ greater than $t_1$.

The duration of the extraction steps may vary within wide limits depending on such factors as the degree of extraction desired, the natural spice being extracted, the size of the equipment and the selected process parameters. Normally periods from about 2 to 10 hours are suitable.

The gas or liquid conveyor means or component 18 used in the cycle can be a liquid gas pump or a compressor, but the functions of the heat exchangers 16 and 17 are then different. If a liquid gas pump is used, carbon dioxide must be liquefied in 17 and the medium must be heated to supercritical conditions in 16. If a compressor is used, the medium must likewise be brought to supercritical temperatures in 17. In practice the heat exchangers are combined and controlled to maintain energy consumption at the most economical level.

The following non-limiting examples are given by way of illustration only:

EXAMPLE 1

200 g ground black pepper were treated as follows under the conditions of case 3:

| 1st step: | $P_1$ = 350 excess at. |
| | $P_2$ = 65 excess at. |
| | $t_1$ = 60 ° C. |
| | $t_2$ = 60° C. |
| | gas: dry $CO_2$ |
| | duration: 3 hours |
| 2nd step: | Conditions as above; gas: wet carbon dioxide, duration: 2 hours. |

Result 14 g of a yellowish, semi-solid mass with crystalline portions were obtained, which had an intensive pepper odor and a very sharp taste.

|                           | untreated pepper | extract | treated pepper |
|---------------------------|------------------|---------|----------------|
| moisture %                | 14.3             | 2       | 20             |
| piperine %                | 4.6              | 60      | <0.1           |
| petroleum ether solubles %| 6.8              | 28      | <0.1           |

EXAMPLE 2

200 g coarse-ground cloves were treated as follows under the conditions of case 1.

| 1st Step: | $P_1 = 280$ excess at. |
|---|---|
| | $P_2 = 65$ excess at. |
| | $t_1 = 50°$ C. |
| | $t_2 = 25°$ C. |
| | gas: dry $CO_2$, duration: 4 hours |
| 2nd Step: | Conditions as above, gas: wet carbon dioxide, duration: 3 hours. |

Result

After mixing the extracts, 25 g of a yellow brown oil containing turbidities and little water, with a very intensive clove aroma, were obtained.

|                              | Cloves, untreated | extract | cloves, treated |
|------------------------------|-------------------|---------|-----------------|
| moisture %                   | 7.8               | 15      | 20              |
| petroleum ether solubles %   | 20.3              | —       | 0.1             |
| eugenol (incl acetaugenol) % | 17.2              | 64      | 0.3             |

EXAMPLE 3

200 g cinnamon sticks were crushed and treated as follows under the conditions of case 1.

| 1st Step: | $P_1 = 300$ excess at. |
|---|---|
| | $P_2 = 65$ excess at. |
| | $t_1 = 55°$ C. |
| | $t_2 = 25°$ C. |
| | gas: dry $CO_2$, duration: 3.5 hours |
| 2nd Step: | Conditions as above, gas: wet carbon dioxide, duration: 4 hours. |

Result 19 g of a yellowish oil containing turbidities with a very intensive cinnamon aroma were obtained.

|                             | Cinnamon, untreated | extract | cinnamon, treated |
|-----------------------------|---------------------|---------|-------------------|
| moisture %                  | 8.4                 | 29      | 30                |
| cinnamaldehyde %            | 3.8                 | 39      | —                 |
| eugenol %                   | 0.56                | 6.3     | —                 |
| petroleum ether solubles %  | 4.5                 | —       | —                 |

EXAMPLE 4

200 g crushed vanilla pods were treated as follows under the conditions of case 1.

| 1st Step: | $P_1 = 400$ excess at. |
|---|---|
| | $P_2 = 65$ excess at. |
| | $t_1 = 45°$ C. |
| | $t_2 = 25°$ C. |
| | gas: dry $CO_2$, duration: 4 hours. |
| 2nd Step: | Conditions as above, gas: wet carbon dioxide, duration: 6 hours. |

Result 27 g of a wet precipitate containing turbidities with a very intensive vanilla aroma were obtained.

|                            | vanilla pods, untreated | extract | vanilla pods, treated |
|----------------------------|-------------------------|---------|-----------------------|
| moisture %                 | 9.3                     | 23      | 31                    |
| vanillin %                 | 3.1                     | 28      | —                     |
| petroleum ether solubles % | 14.3                    | —       | 0.1                   |

Note: The sum of the extract components listed in the above examples is less than 100%, since only the principal components were determined quantitatively.

What is claimed is:

1. A process for the production of spice extracts from natural spice selected from the group consisting of black pepper, clove, cinnamon and vanilla which comprises the steps of:

(a) contacting a solvent gas, which in the dry supercritical state is effective to dissolve the essential oil component containing aroma constituents from the natural spice and leave a first spice residue containing flavor constituents, with the natural spice, for a time sufficient to extract the essential oil component of the spice and leave a first spice residue containing flavor constituents, the solvent gas being in dry supercritical state, (b) separating the aroma constituents from the solvent gas, (c) contacting a solvent gas, which in the wet supercritical condition is effective to dissolve the flavor constituents of the natural spices and leave a second spice residue, with the first spice residue, for a time sufficient to extract the flavor constituents of the first spice residue and leave said second spice residue, the solvent gas being in wet supercritical state, (d) separating the flavor constituents from the extraction solvent gas of step c, wherein the solvent gas in each of steps (a) and (c) is selected from the group consisting of carbon dioxide; saturated and unsaturated hydrocarbons containing up to three carbon atoms; nitrous oxide; saturated and unsaturated halogenated hydrocarbons containing up to three carbon atoms wherein the halogen is at least one of fluorine and chlorine; sulfur hexafluoride and mixtures thereof.

2. A process according to claim 1 including the further steps of extracting the second spice residue with water to produce an aqueous extract, and removing at least a portion of the water from the aqueous extract.

3. Process according to claim 2, wherein the essential oil product of step b, the flavor constituent product of step d and the product of the water extract step are mixed.

4. A process according to claim 1 wherein the solvent gas in each of Steps (a) and (c) is carbon dioxide.

5. Process according to claim 1, wherein the temperature in each of steps a and c is up to 80° C.

6. Process according to claim 1, wherein the flavoring constituents are separated from the extraction solvent gas of step c, in the presence of the product of step b.

7. Process according to claim 1, wherein the separation in each of steps b and d is effected by adjusting the temperature or pressure.

8. Process according to claim 1, wherein the natural spice is in ground condition.

9. Process according to claim 1, wherein the spice is black pepper.

10. Process according to claim 1, wherein the spice is clove.

11. Process according to claim 1, wherein the spice is cinnamon.

12. Process according to claim 1, wherein the spice is vanilla.

13. A process as in claim 1 wherein the flavor constituents are separated out of the presence of the product of Step (b), and the products of the two separating steps are thereafter mixed.

* * * * *

UNITED STATES PATENT AND TRADEMARK OFFICE
CERTIFICATE OF CORRECTION

PATENT NO. : 4,198,432
DATED : April 15, 1980
INVENTOR(S) : Otto Vitzthum and Peter Hubert It is certified that error appears in the above-identified patent and that said Letters Patent are hereby corrected as shown below:

Column 2, line 5, for "solent" read --solvent--;

Column 3, line 41, for "web" read --wet--.

Signed and Sealed this

Sixteenth Day of September 1980

[SEAL]

Attest:

SIDNEY A. DIAMOND

Attesting Officer   Commissioner of Patents and Trademarks